(12) United States Patent
Kelso et al.

(10) Patent No.: US 10,817,124 B2
(45) Date of Patent: Oct. 27, 2020

(54) PRESENTING USER INTERFACE ON A FIRST DEVICE BASED ON DETECTION OF A SECOND DEVICE WITHIN A PROXIMITY TO THE FIRST DEVICE

(71) Applicant: Lenovo (Singapore) Pte. Ltd., New Tech Park (SG)

(72) Inventors: Scott Edwards Kelso, Cary, NC (US); John Weldon Nicholson, Cary, NC (US); Steven Richard Perrin, Raleigh, NC (US); Jian Li, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1293 days.

(21) Appl. No.: 14/294,792

(22) Filed: Jun. 3, 2014

(65) Prior Publication Data
US 2015/0346946 A1    Dec. 3, 2015

(51) Int. Cl.
*H04W 4/80* (2018.01)
*G06F 3/01* (2006.01)
(Continued)

(52) U.S. Cl.
CPC .......... *G06F 3/04812* (2013.01); *G06F 3/017* (2013.01); *G06F 3/03545* (2013.01);
(Continued)

(58) Field of Classification Search
CPC .. G06F 3/04812; G06F 3/017; G06F 3/03545; G06F 3/04883; G06F 3/0484;
(Continued)

(56) References Cited

U.S. PATENT DOCUMENTS

| 4,866,646 A | 9/1989 | Nakamura et al. |
| 5,243,149 A | 9/1993 | Comerford et al. |

(Continued)

FOREIGN PATENT DOCUMENTS

| CN | 201577133 U | 9/2010 |
| CN | 102681747 | 9/2012 |

(Continued)

OTHER PUBLICATIONS

"How to fix the height offset on your Wacom Bamboo" by Ang's Tech Bits published May 1, 2013, archived by the Internet Wayback Machine Dec. 10, 2013 downloaded from https://web.archive.org/web/20131210043507/https://angstechbits.wordpress.com/2013/05/01/how-to-fix-the-height-offset-on-your-wacom-bamboo-pen/ on Nov. 2, 2017.*

(Continued)

*Primary Examiner* — Pei Yong Weng
*Assistant Examiner* — Ayesha E Huertas Torres
(74) *Attorney, Agent, or Firm* — John M. Rogitz; John L. Rogitz

(57) ABSTRACT

In one aspect, a device includes a touch-enabled display, a processor, and a memory accessible to the processor. The memory bears instructions executable by the processor to determine that an input device is within a proximity to the touch-enabled display, and in response to the determination and without supplemental input from a person, present on the touch-enabled display a user interface (UI) for providing input to the first device at least in part based on manipulation of the input device.

18 Claims, 6 Drawing Sheets

(51) Int. Cl.
  *G06F 3/0481* (2013.01)
  *H04W 4/21* (2018.01)
  *G06F 3/0354* (2013.01)
  *G06F 3/0488* (2013.01)
  *G06F 3/0484* (2013.01)
  *H04L 29/08* (2006.01)

(52) U.S. Cl.
  CPC .......... *G06F 3/0484* (2013.01); *G06F 3/0488* (2013.01); *G06F 3/04883* (2013.01); *H04L 67/10* (2013.01); *H04W 4/21* (2018.02); *H04W 4/80* (2018.02)

(58) Field of Classification Search
  CPC ......... G06F 3/0488; H04W 4/80; H04W 4/21; H04L 67/10
  See application file for complete search history.

(56) References Cited

U.S. PATENT DOCUMENTS

| | | | |
|---|---|---|---|
| 6,088,481 A | 7/2000 | Okamoto et al. | |
| 6,128,007 A | 10/2000 | Seybold | |
| 6,525,716 B1 | 2/2003 | Makino | |
| 6,957,233 B1 | 10/2005 | Beezer et al. | |
| 7,032,187 B2 * | 4/2006 | Keely, Jr. .............. | G06F 3/0483 345/179 |
| 7,123,770 B2 | 10/2006 | Raghupathy et al. | |
| 7,751,623 B1 | 7/2010 | Simmons et al. | |
| 8,315,482 B2 | 11/2012 | Hou et al. | |
| 8,351,904 B2 | 1/2013 | Kim et al. | |
| 2003/0046588 A1 * | 3/2003 | Gliniecki ................ | G06F 21/35 726/4 |
| 2003/0214540 A1 * | 11/2003 | Huapaya ............... | G06F 3/0481 715/863 |
| 2003/0215145 A1 | 11/2003 | Shilman et al. | |
| 2004/0160427 A1 * | 8/2004 | Keely, Jr. .............. | G06F 3/0483 345/179 |
| 2004/0172588 A1 * | 9/2004 | Mattaway ........... | H04L 12/1822 715/201 |
| 2005/0052434 A1 * | 3/2005 | Kolmykov-Zotov ........................ | G06F 3/038 345/179 |
| 2005/0281467 A1 | 12/2005 | Stahovich | |
| 2006/0161870 A1 * | 7/2006 | Hotelling .............. | G06F 3/0485 715/863 |
| 2007/0150842 A1 * | 6/2007 | Chaudhri .............. | G06F 3/0488 715/863 |
| 2008/0259045 A1 * | 10/2008 | Kim ....................... | G06F 3/0486 345/173 |
| 2009/0158201 A1 | 6/2009 | Iampietro et al. | |
| 2009/0199127 A1 * | 8/2009 | Sareen .................. | G06F 3/0481 715/781 |
| 2009/0265670 A1 * | 10/2009 | Kim .................... | G06F 3/04883 715/863 |
| 2011/0161341 A1 | 6/2011 | Johnston | |
| 2011/0285669 A1 * | 11/2011 | Lassesson ............ | G06F 3/0428 345/175 |
| 2012/0120002 A1 | 5/2012 | Ota | |
| 2012/0302167 A1 | 11/2012 | Yun et al. | |
| 2013/0285929 A1 | 10/2013 | Theimer et al. | |
| 2013/0321314 A1 | 12/2013 | Oh et al. | |
| 2014/0055399 A1 | 2/2014 | Lee et al. | |
| 2014/0059493 A1 | 2/2014 | Kim | |
| 2014/0229847 A1 * | 8/2014 | Park ...................... | G06F 1/1684 715/744 |

FOREIGN PATENT DOCUMENTS

| | | | |
|---|---|---|---|
| CN | 103197843 A | 7/2013 | |
| CN | 103631514 A | 3/2014 | |
| CN | 103092502 B | 11/2018 | |
| GB | 2462171 A | 2/2010 | |

OTHER PUBLICATIONS

"Jquery—Only execute function if mouse has hovered for more than 1 second" published by Stack Overflow, Sep. 23, 2013, dowloaded Jul. 9, 2018 from https://stackoverflow.com/questions/18965792/only-execute-function-if-mouse-has-hovered-for-more-than-1-second (Year: 2013).*

"Transition Delay Delays" by Chris Coyier, Jun. 26, 2012 dowloaded Jul. 9, 2018 from https://css-tricks.com/transition-delay-delays/ (Year: 2012).*

"Shorthand options Make life easier with shorthand mappings" archived Jul. 11, 2013 downloaded Jul. 9, 2018 from https://web.archive.org/web/20130711135624/http://qtip2.com/options (Year: 2013).*

Xin Feng, Mei-Wen Sun, James Anthony Hunt, "Automatic Launch and Data Fill of Application", related pending U.S. Appl. No. 14/160,752, filed Jan. 22, 2014.

Xin Feng, Mei-Wen Sun, James Anthony Hunt, "Automatic Launch and Data Fill of Application", related U.S. Appl. No. 14/160,752. Final Office Action dated Mar. 10, 2016.

Xin Feng, Mei-Wen Sun, James Anthony Hunt, "Automatic Launch of Data Fill of Application", related U.S. Appl. No. 14/160,752, Applicant's response to Non-Final Office Action filed Feb. 15, 2017.

Xin Feng, Mei-Wen Sun, James Anthony Hunt, "Automatic Launch and Data Fill of Application", related U.S. Appl. No. 14/160,752, Non-Final Office Action dated Dec. 2, 2016.

Xin Feng, Mei-Wen Sun, James Anthony Hunt, "Automatic Launch and Data Fill of Application", related U.S. Appl. No. 14/160,752, Non-Final Office Action dated Nov. 20, 2015.

Xin Feng, Mei-Wen Sun, James Anthony Hunt. "Automatic Launch and Data Fill of Application", related U.S. Appl. No. 14/160,752, Applicant's response to Non-Final Office Action filed Nov. 30, 2015.

Xin Feng, Mei-En Sun, James Anthony Hunt, "Automatic Launch and Data Fill of Application", related pending U.S. Appl. No. 14/160,752, applicant response to final office action filed May 10, 2016.

Xin Feng, Mei-Wen Sun, James Anthony Hunt, "Automatic Launch and Data Fill of Application", related U.S. Appl. No. 14/160,752, Non-Final Office Action dated Jun. 15, 2017.

Xin Feng, Mei-Wen Sun, James Anthony Hunt, "Automatic Launch of Data Fill of Application", related U.S. Appl. No. 14/160,752, Applicant's response to Non-Final Office Action filed Sep. 12, 2017.

Xin Feng, Mei-Wen Sun, James Anthony Hunt, "Automatic Launch and Data Fill of Application", related U.S. Appl. No. 14/160,752, Final Office Action dated Dec. 28, 2017.

Xin Feng, Mei-Wen Sun, James Anthony Hunt, "Automatic Launch and Data Fill of Application", related U.S. Appl. No. 14/160,752, Non-Final Office Action dated May 10, 2018.

"Jquery—Only execute function if mouse has hovered for more than 1 second", published by Stack Overflow, Sep. 23, 2013, retrieved from https://stackoverflow.com/questions/18965792/only-execute-function-if-mouse-has-hovered-for-more-than-1-second (Year: 2013).

"Shorthand Options Make Life Easier with Shorthand Mappings", archived Jul. 11, 2016, retrieved from https://web.archive,org/web/20130711135624/http://qtip2.com/options (Year: 2013).

"Transition Delay Delays" by Chris Coyier, Jun. 26, 2012, retrieved from https://css-tricks.com/transition-delay-delays/ (Year:2012).

Scott Edwards Kelso, John Weldon Nicholson, Steven Richard Perrin, Jian Li, "Presenting User Interface on a First Device Based on Detection of a Second Device Within a Proximity to the First Device", related U.S. Appl. No. 14/294,792, Final Office Action dated Jul. 16, 2018.

Xin Feng, Mei-Wen Sun, James Anthony Hunt, "Automatic Launch and Data Fill of Application", related U.S. Appl. No. 14/160,752, Applicant's response to Non-Final Office Action filed Aug. 8, 2018.

Feng et al., "Automatic Launch and Data Fill of Application", related U.S. Appl. No. 14/160,752, Applicants response to Final Office Action filed May 23, 2019.

(56) References Cited

OTHER PUBLICATIONS

Feng et al., "Automatic Launch and Data Fill of Application", related U.S. Appl. No. 14/160,752, Examiners Answer dated Sep. 20, 2019.
Feng et al., "Automatic Launch and Data Fill of Application", related U.S. Appl. No. 14/160,752, Final Office Action dated Dec. 13, 2018.
Feng et al., "Automatic Launch and Data Fill of Application", related U.S. Appl. No. 14/160,752, Reply Brief filed Nov. 7, 2019.

* cited by examiner

PRESENTING USER INTERFACE ON A FIRST DEVICE BASED ON DETECTION OF A SECOND DEVICE WITHIN A PROXIMITY TO THE FIRST DEVICE

I. FIELD

The present application relates generally to presenting a user interface on a first device based on detection of a second device within a proximity to the first device.

II. BACKGROUND

There are currently no relatively adequate, automatic, and/or easy ways for a user to cause a user interface (UI) to be presented on a device to provide input to that UI e.g. using another device when a different UI is presented and the user wishes that the different UI again be presented e.g. automatically and/or seamlessly after providing the input.

SUMMARY

Accordingly, in one aspect a device includes a touch-enabled display, a processor, and a memory accessible to the processor. The memory bears instructions executable by the processor to determine that an input device is within a proximity to the touch-enabled display, and in response to the determination and without supplemental input from a person, present on the touch-enabled display a user interface (UI) for providing input to the first device at least in part based on manipulation of the input device.

In another aspect, a method includes determining that a first device is one of at a threshold distance to a second device and within the threshold distance to the second device. The method also includes, in response to the determining that the first device is one of at and within the threshold distance and without user input to a second device different from the first device other than to move the first device to one of at and within the threshold distance, presenting on a display a user interface (UI) for providing input to the second device at least in part using the first device. Further still, the method includes determining that the first device is no longer at least one of at the threshold distance and within the threshold distance and, in response to the determining that the first device is no longer at least one of at the threshold distance and within the threshold distance, removing the UI from the display.

In still another aspect, a computer readable storage medium that is not a carrier wave bears instructions executable by a processor to determine that an input device is within a proximity to a predefined area of a touch-enabled display, where the predefined area of the touch-enabled display is not the entire area of the touch-enabled display. The instructions are also executable to, in response to the determination, present on the touch-enabled display a user interface (UI) for providing input to the touch-enabled display at least based on manipulation of the input device.

The details of present principles, both as to their structure and operation, can best be understood in reference to the accompanying drawings, in which like reference numerals refer to like parts, and in which:

DETAILED DESCRIPTION

Figure 1:
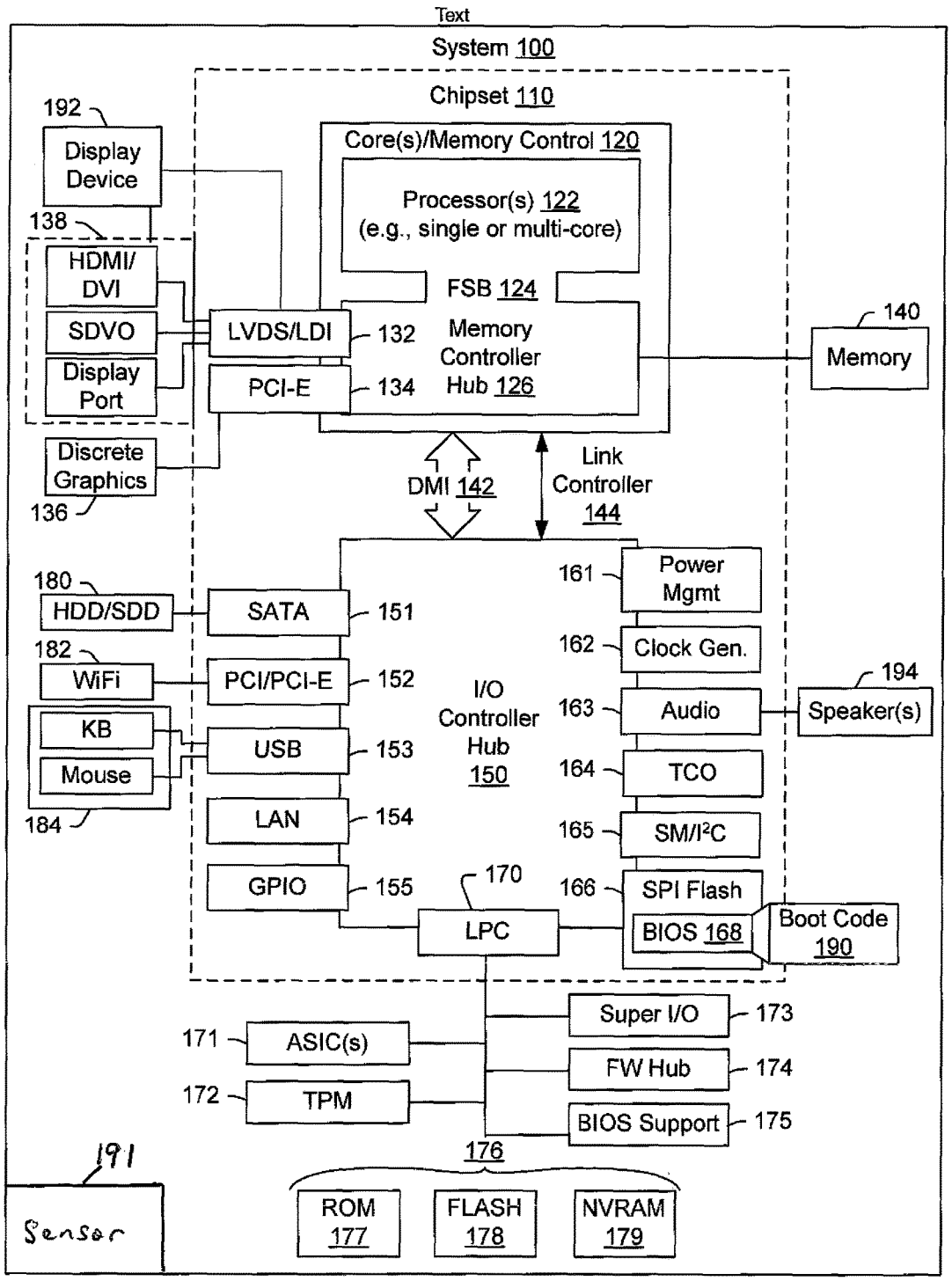
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium.

Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

A sensor 191 is also shown on the system 100, which is understood to be in communication with and configured to provide input to the processor 122. The sensor 191 may be, e.g., camera such as a thermal imaging camera, a digital camera such as a webcam, and/or a camera integrated into the system 100 and controllable by the processor 122 to gather pictures/images and/or video. In addition to or in lieu of the foregoing, the sensor 191 may be position sensor, distance sensor, and/or motion sensor, but in any case is understood to be actuatable at least to e.g. determine the distance to and/or motion from another device such as a stylus (e.g. at least when within a detectable range of the sensor 191) and provide input regarding the distance and/or motion to the processor 122.

Additionally, though now shown for clarity, in some embodiments the system 100 may include a gyroscope for e.g. sensing and/or measuring the orientation of the system 100, an accelerometer for e.g. sensing acceleration and/or movement of the system 100, an audio receiver/microphone in communication with the processor 122 and providing input thereto based on e.g. a user providing audible input to the microphone. Still further, and also not shown for clarity, the system 100 may include a GPS transceiver that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
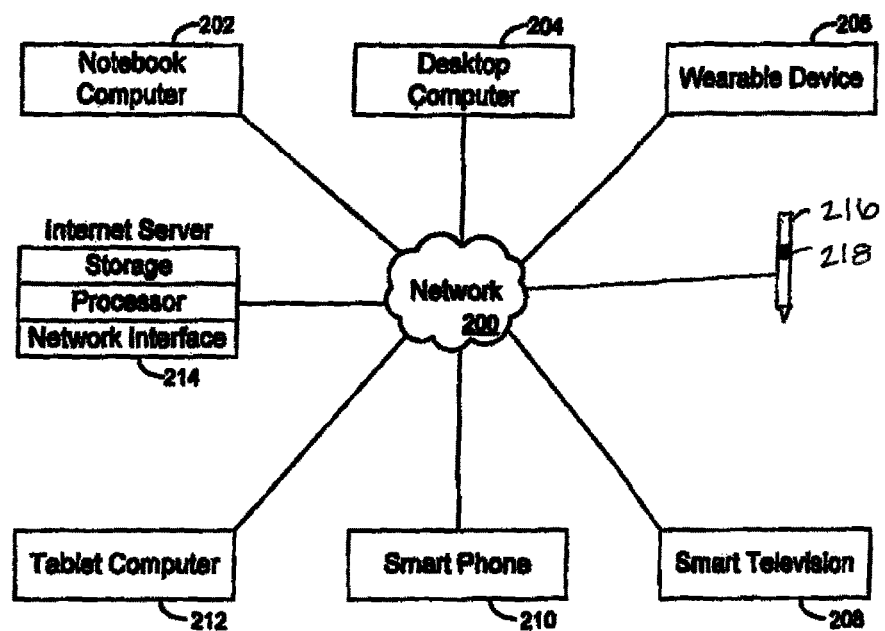
FIG. 2 is a block diagram of a network of devices in accordance with present principles.

Before moving on to FIG. 2, it is to be understood that an example client device or other machine/computer may include fewer or more features than shown on the system 100 of FIG. 1. For instance, e.g., the system 100 may include one or more additional components to receive and/or provide input via different methods and/or of different types in accordance with present principles, such as e.g. the system 100 including or otherwise being associated with a pen and/or stylus. Furthermore, note that e.g. for handwriting and/or drawing input to the system 100, the input may be provided using wireless communication such as through Bluetooth signals and ultrasonic signals from another device (e.g. a pen). In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, an input device 216, and a server 214 such as e.g. an Internet server that may e.g. provide cloud storage accessible to the devices 202-212 and 216. It is to be understood that the devices 202-216 are configured to communicate with each other over the network 200 to undertake present principles.

Describing the input device 216 in more detail, it may be a pen such as e.g. an electronic pen, stylus pen, ultrasonic pen, infrared (IR) pen, etc. Furthermore, note that the device 216 is configured to provide input to one or more of the devices 202-214, including e.g. providing (e.g. handwriting and/or drawing) input to touch-enabled pads and touch-enabled displays on the devices 202-214 in accordance with present principles e.g. when in physical contact therewith and/or based on manipulation of the device 216 against another of the devices 202-214 by a user. Also note that the device 216 includes at least one selector element 218 which may be e.g. a button physically protruding from a housing of the device 216 and/or may be e.g. a touch-enabled selector element flush with the housing. In any case, the element 218 is understood to be selectable to provide input to the pen which may then be transmitted to another of the devices 202-214 in accordance with present principles. What's more, though not shown it is to be understood that the device 216 may also include e.g. an accelerometer for sensing motion of the device 216, and/or a sensor for sensing contact of at least a portion of the device 216 with a body part of a person and/or pressure levels for pressure applied to the device 216 from the person (e.g. a pinch gesture on the barrel portion of the device 216). Still further, note that the device 216 may communicate with one or more of the devices 202-214 (and/or e.g. the system 100) using wireless communication such as e.g., Wi-Fi (e.g. Wi-Fi direct), Bluetooth, and/or NFC communication.

Figure 3:
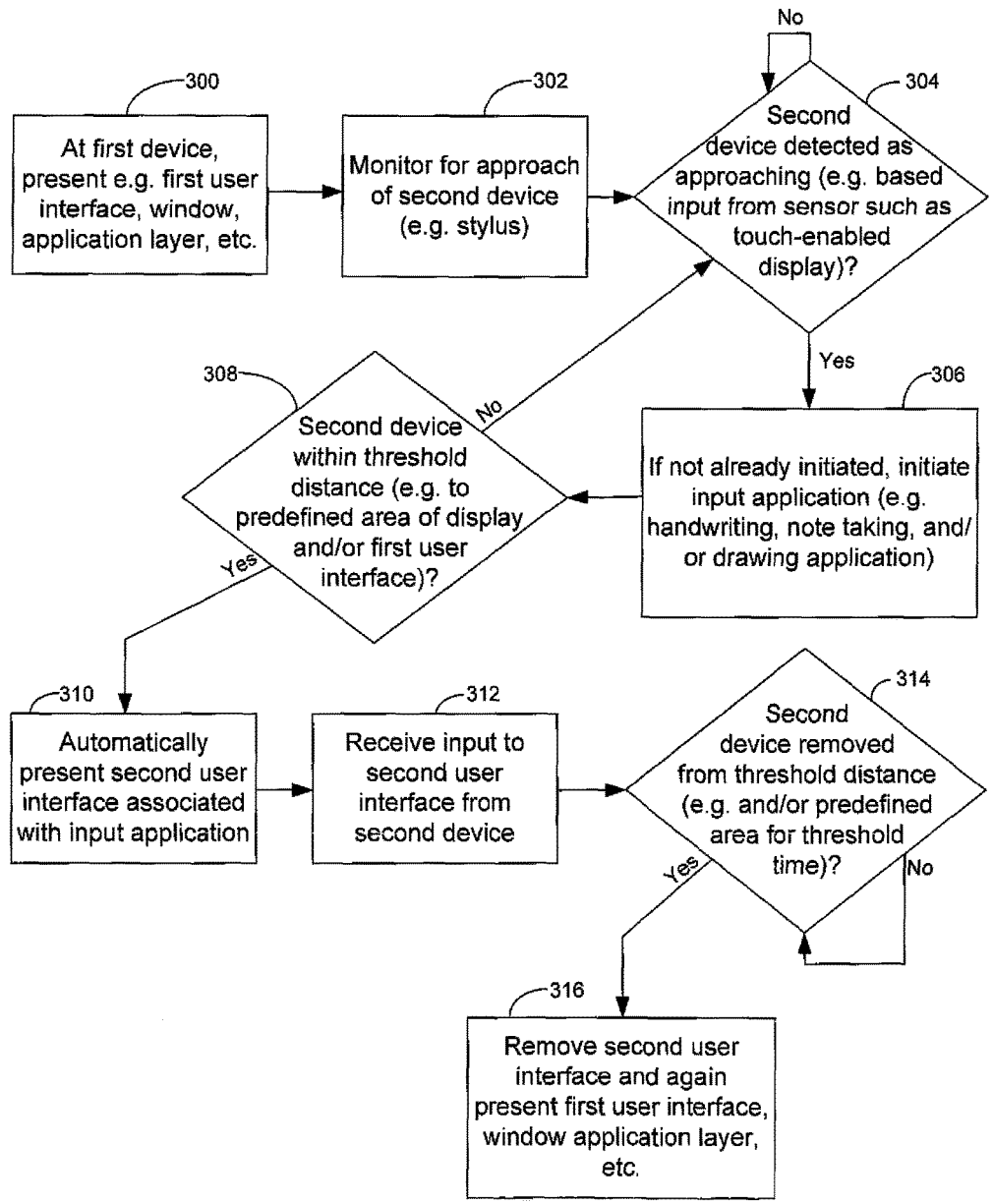
FIG. 3 is a flow chart showing an example algorithm in accordance with present principles.

Referring to FIG. 3, it shows example logic that may be undertaken by a device such as the system 100 in accordance with present principles. Beginning at block 300, the logic presents e.g. a first user interface (UI), window, or application layer, etc. at a first device (e.g. such as the system 100). The first UI, window, or layer (referred to below as the "first UI" for simplicity) may be for an application such as but not limited to e.g. an Internet browser, a music streaming service, a social networking application, a news application, etc. In any case, once the first UI has been presented e.g. on a touch-enabled display of the first device, the logic proceeds to block 302. At block 302 the logic monitors (e.g. monitors and/or actuates the touch-enabled display) for an approach toward the first device of a second device such as e.g. a stylus. From block 302 the logic proceeds to decision diamond 304.

Thus, at diamond 304 the logic determines whether a second device has been detected as approaching the first device, which in some embodiments may be based on input to a processor of the first device from a sensor on the first device (e.g. such as a camera, a touch-enabled display, another sensor disclosed herein, etc.). Regardless, a negative determination at diamond 304 causes the logic to continue making the determination thereat until an affirmative determination is made. Then, responsive to an affirmative determination at diamond 304, the logic proceeds to block 306 where the logic initiates one or more input applications in accordance with present principles, such as e.g. a handwriting application, a note taking application, a drawing application, and/or still another application which may be used to provide input to the first device based on manipulation of the second device (e.g. to contact the touch-enabled display of the first device to direct handwriting input thereto). From block 306, the logic then moves to decision diamond 308. However, before describing decision diamond 308, it is to be understood that an input application may be initiated at block 306 e.g. if it is not already initiated and/or executing on the first device. If the logic determines that the input application is already initiated and/or executing, the logic need not initiate it at block 306 but may in any case proceed to diamond 308.

Now in reference to diamond 308, the logic determines whether the second device is within a distance threshold of at least a (e.g. predefined) portion of the first device, such as e.g. a predefined area of the first device's touch-enabled display and/or a predefined area of an UI presented on the first device's touch-enabled display. The threshold distance may be e.g. preset by the manufacturer of the first device, and/or may be established by a user of the first device by e.g. manipulating a settings UI such as the UI 700 which will be described below. A negative determination at diamond 308 causes the logic to revert back to diamond 304 and proceed therefrom. However, an affirmative determination at diamond 308 instead causes the logic to proceed to block 310, at which the logic automatically without further user input (e.g. other than moving the second input device to within the threshold distance) presents a second UI that is associated with one or more input applications (e.g. an application initiated at block 306 and/or already determined by the logic to be initiated and/or executing at block 306) and that is sometimes referred to below as an "input UI."

From block 310 the logic proceeds to block 312, where the logic may receive input to the second UI e.g. from the second device and/or from a user (e.g. based on a user making contact with the first device's touch-enabled display with a portion of their finger). Regardless of whether any input is received at block 312, the logic may proceed therefrom to decision diamond 314. At diamond 314, the logic determines whether the second device has been removed from the threshold distance (e.g. and/or removed from a threshold distance to one or more of the predefined areas discussed above). E.g., an affirmative determination may be made at diamond 314 when a user moves the second device away from the first device's touch-enabled display beyond the threshold distance. In any case, a negative determination at diamond 314 causes the logic to continue making the determination thereat until an affirmative determination is made, and once an affirmative determination is made at diamond 314 the logic proceeds to block 316. In lieu of the foregoing, but still responsive to a negative determination at diamond 314, the logic may revert to block 312 and then continue therefrom.

At block 316 the logic responsive to the affirmative determination at diamond 314 removes the second UI from presentation on the first device. Also, in some embodiments at block 316 the logic may present the first UT again.

Figure 4:
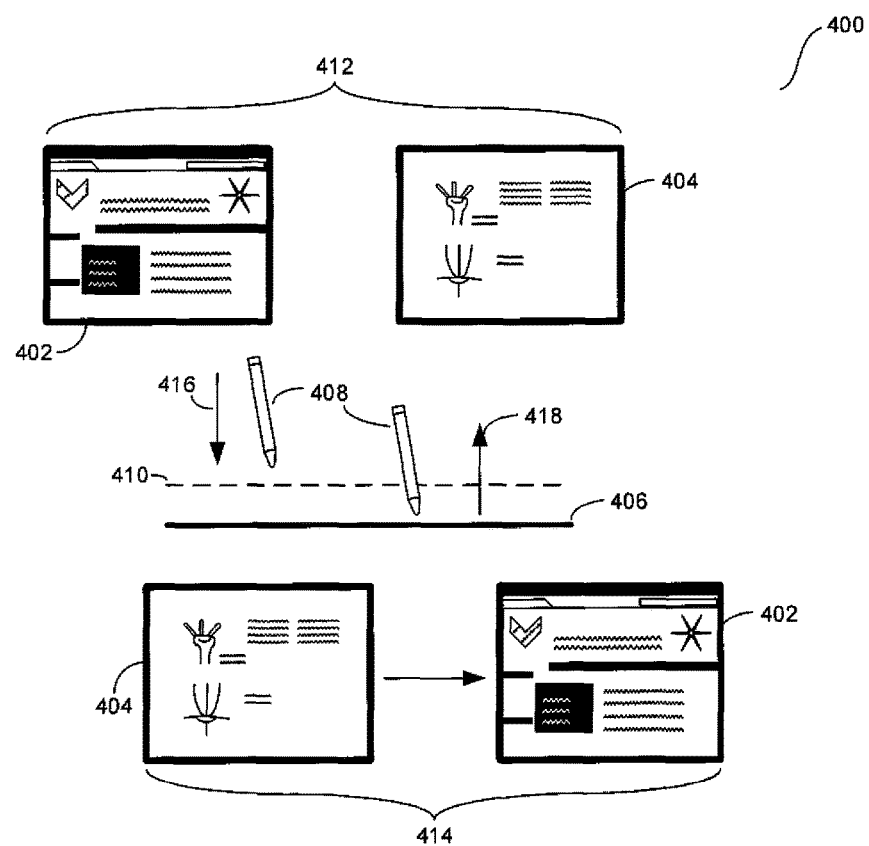
FIG. 4 is an example illustration in accordance with present principles.

Continuing the detailed description in reference to FIG. 4, it shows an example illustration 400 of present principles. The illustration 400 shows a first UI 402 which may be e.g. an Internet browser UI presented on a tablet device 406. FIG. 4 also shows a second UI 404 which is an input UI for an input application in accordance with present principles, and in the example shown includes both drawings and handwriting that has been provided by a user e.g. using a stylus 408.

Note that as shown in the illustration, at a first time the stylus 406 is more than (e.g. above) a distance threshold away from the tablet device 406, where the distance threshold is represented by the perforated line 410 shown in the figure. Then, at a second time the stylus 406 is shown as having at least a portion thereof within (e.g. beneath) the distance threshold (and as shown, in contact with the touch-enabled display of the tablet device 406), which is understood to be detectable by the tablet device 406 and which may cause the tablet device 406 to remove presentation of the UI 402 from the tablet device 406 and present the UI 404, as shown by the portion 412 of the illustration. Thereafter, the stylus may be moved away from the tablet device 406 beyond the distance threshold, which is also understood to be detectable by the tablet device 406 and which may cause the tablet device 406 remove presentation of the UI 404 from the tablet device 406 and again present the UI 402, as shown by the portion 414 of the illustration 400.

Though two illustrations of the stylus 406 are shown, it is to be understood that the description of FIG. 4 is made in the context of there being only a single stylus 406. Two are shown at different positions relative to the distance threshold as represented by the line 410 for illustration purposes. Arrows 416 and 418 thus illustrate the stylus 406 respectively moving within and away from the distance threshold.

Figure 5:
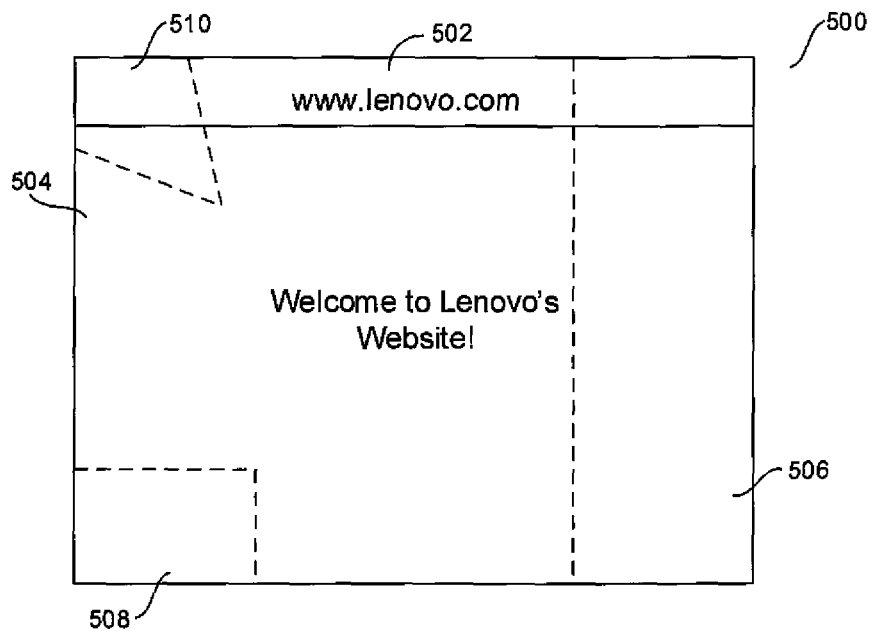
FIGS. 5-7 are example user interfaces (UI) in accordance with present principles.

Now in reference to FIG. 5, it shows an example UI 500 presentable on a device such as the system 100. The UI 500 is understood to be for an Internet browser. As shown, the UI 500 includes at least a first portion 502 at which a website address is presented for a website currently being presented on the UT 500. Thus, the UI 500 also includes another portion 504 at which at least a portion of the website itself is presented.

Additionally, FIG. 5 shows a first area 506, second area 508, and third area 510 respectively outlined and/or represented by the perforated lines shown. It is to be understood that each of the areas may be an area of the display presenting the UT 500 (and/or an area specifically for the UI 500 itself) above which an input device such as a stylus may hover as detected by the display to invoke an input UI associated with an input application (e.g. an UI for providing handwriting and/or note taking input thereto) in accordance with present principles. Thus, it is to be understood that in example embodiments such as the one being described, a hover of the stylus over another portion of the display and/or UI 500 not comprising the areas 506, 508, and 510 (e.g. even if detected by the display) will not cause the device presenting the UI 500 to present the input UI associated with the input application since a hover has not been detected over one of the areas 506, 508, and 510.

Still in reference to FIG. 5, it is to also be understood that each of the areas 506, 508, and 510 need not be invocable based on a hover to present the same input UI. E.g. in some embodiments each area may be respectively invocable to cause a different input UI of the same input application to be presented, and also in some embodiments each area may be respectively invocable to cause a different input UI associated with a different input application to be presented (e.g. a drawing application for area 506, a different note taking application for area 508, and a different handwriting application for area 510). Furthermore, note that the size and/or shape for each of the areas 506, 508, and 510 may be configured and/or established by a user, such as e.g. using a drag and drop action when configuring the areas 506, 508, 510 (e.g. in a configuration mode for the UI 500 and/or associated application) by selecting the UI 500 at a point and dragging (e.g. a cursor) from the point to another location away from the point to thus at least in part establish the shape and/or size of the respective area (e.g. the above process may be done more than once to establish respective lines to form a boundary for the area being configured). Still further, it is to be understood that the predefined areas 506, 508, and 510 may be established at the device based on and/or in terms of display pixels (e.g. the area is to encompass a certain number and location of pixels), the location of an element, menu bar, button, etc. on an UI such as the UI 500, and/or may be established at the device based on horizontal and vertical coordinates associated with the display (e.g. X-Y coordinates).

Figure 6:
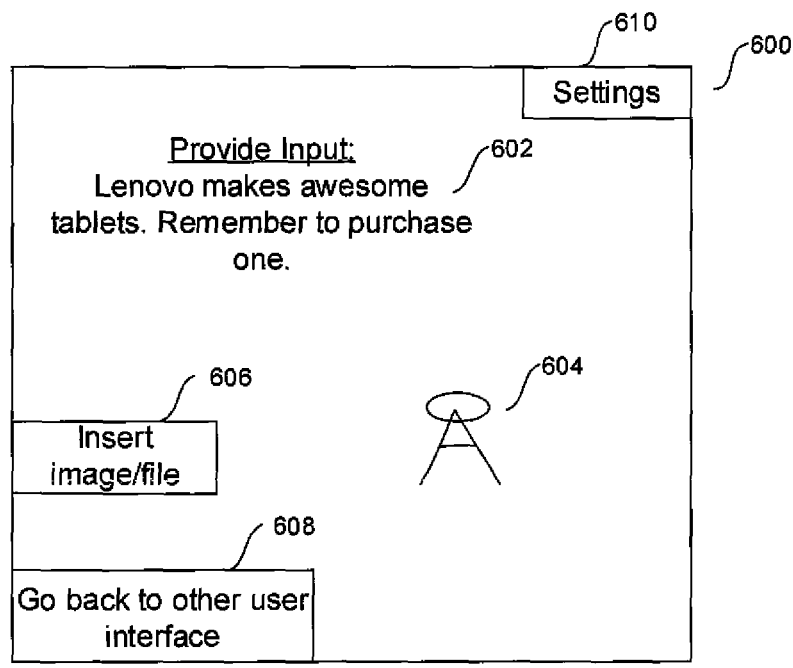

Turning now to FIG. 6, it shows an example UI 600 for an input application in accordance with present principles, which may be presented e.g. responsive to detection of a stylus hovering over a display of the device presenting the UI 600 (e.g. and in some embodiments, more specifically, detection of a stylus hovering over a predefined area such as the areas 506, 508, and 510 just described). The UI 600 may be presented e.g. to occupy the entire presentable area of a touch-enabled display, and/or may be overlaid onto and/or pop up over merely a portion of another UI (e.g. the UI 500) that was presented prior to detection of the stylus hovering over the display. Note that the UI 600 has a representation 602 of handwriting input provided by a user to the device e.g. by using a stylus. The UI 600 also includes a representation 604 of a drawing provided by a user to the device e.g. by using a stylus.

In addition to the foregoing, the UI 600 may also include a selector element 606 selectable to automatically without further user input respective thereto cause a browser window to be presented on the display of the device presenting the UI 600 (e.g., be overlaid on the UI 600) for a user to browse to a file, folder, image, video, etc. for selection to be included on and/or inserted into the UI 600 e.g. at a location indicated by a user using the stylus. Also shown on the UI 600 is a selector element 608 that is selectable to automatically without further user input respective thereto cause a previously presented UI to again be presented, such as e.g. the UI 500 that in the present example was presented prior to detection of the stylus over the display of the device within a threshold distance to the display. Still further, in some embodiments a selector element 610 may be presented that is selectable to automatically without further user input respective thereto cause a settings UI (such as the UI 700 which will be described below) to be presented for configuring settings for the input UI and/or associated application, and/or configuring still other settings in accordance with present principles such as a particular threshold distance or threshold time for hovering to invoke an input UI of an input application as described herein.

Figure 7:
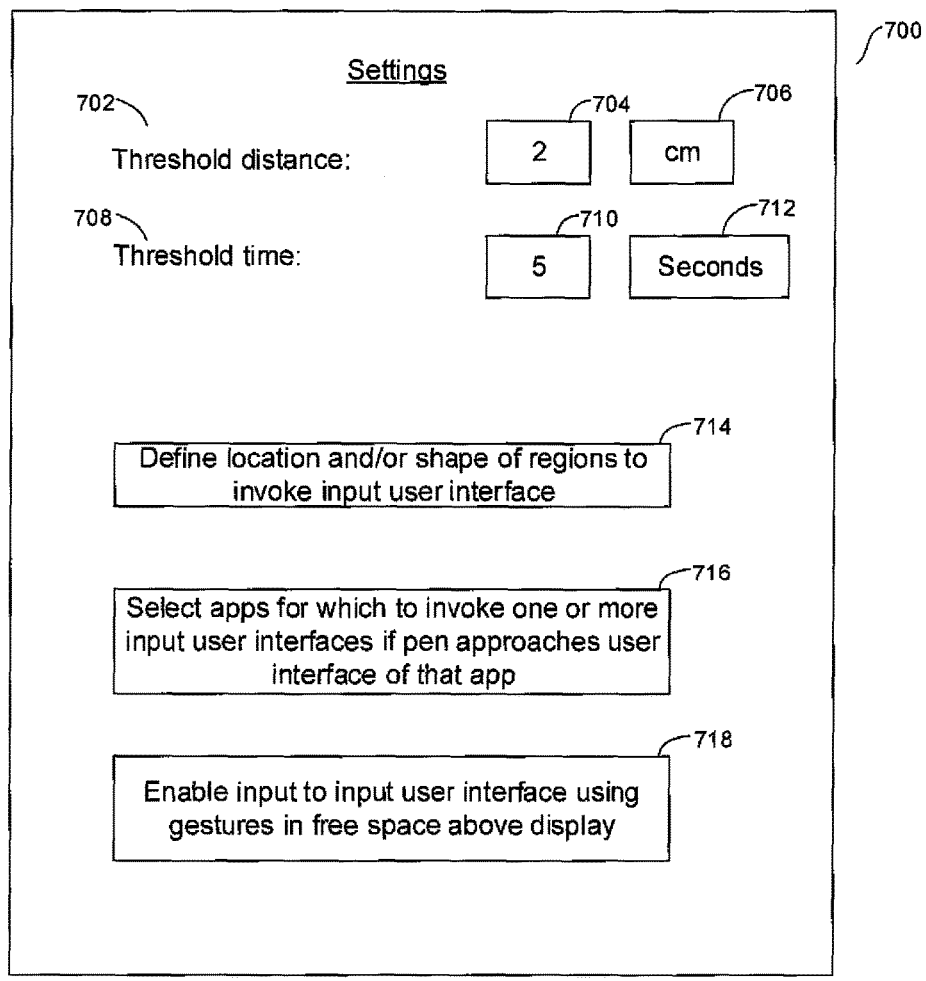

Before moving on to FIG. 7, it is to be understood in reference to FIG. 6 that although not shown, in addition to or in lieu of the element 608, a navigation e.g. menu or bar, and/or another option such as a pop-up table of contents, may be presented on the UI 600 for navigating to and/or causing the previously presented UI to again be presented.

Continuing the detailed description now in reference to FIG. 7, a settings UI 700 is shown. In the example shown, the UI 700 includes a first setting 702 for establishing a threshold distance for hovers which invoke an input UI and/or application. Text entry box 704 is thus selectable to enter, add, and/or delete a number for the distance, while box 706 is selectable to select (e.g. via a drop down box of selectors from the box 706) a unit of length to which the number entered to box 704 is to pertain. Thus, as may be appreciated from FIG. 7, a threshold distance has been set by a user at two centimeters.

The UI 700 also includes a second setting 708 for establishing a threshold time for removal of a stylus from the threshold distance, the expiration of which may cause an UI (e.g. an Internet browser UI) to be presented that was presented previous to the presentation of the input UI. Accordingly, text entry box 710 is selectable to enter, add, and/or delete a number for the time, while box 712 is selectable to select (e.g. via a drop down box of selectors from the box 712) a unit of time to which the number entered to box 710 is to pertain. Thus, as may be appreciated from FIG. 7, a threshold time has been set by a user at five seconds.

Still in reference to FIG. 7, the UI may also include one or more other selector elements, such as the elements 714, 716, and 718 shown, all of which are understood to be selectable to automatically without further user input undertake the function associated with the respective selector element. Accordingly, the element 714 is selectable to cause e.g. another window or UI to be presented for defining one or more areas and/or one or more shapes for the areas (e.g. as described above in reference to the areas 506, 508, and 510), where the areas are understood to be invocable from e.g. an UI other than an input UI (e.g. an Internet browser UI) to cause an input UI to be presented. Note that such areas may be established for any UI to be presented on the device regardless of their respectively associated applications, while in other embodiments these areas may be established on a per-application and/or per-UI basis.

Another selector element 716 is shown that is selectable to cause e.g. another window or UI to be presented listing one or more applications associated with and/or stored on the device presenting the UI 700 for selection therefrom to cause the device to detect hovers over an UI associated with the selected application(s) to present an input UI as discussed herein. The selector element 718 is understood to be selectable to enable input to an input UI using gestures in free space (e.g. above the display of the device and/or within a threshold distance (e.g. established by a user at least in part using the setting 702)) rather than actual contact with a display of a stylus and/or body part of a user to provide e.g. drawing input, handwriting input, note taking input, etc. Such gestures (e.g. writing or drawing in free space as if writing or drawing on a surface such as the display) may be detected, identified, and/or determined using e.g. a camera on the device and/or gesture recognition principles and/or software.

Thought not shown, it is to be understood that the UI 700 may include still other selector elements e.g. selectable to automatically without further user input undertake the function associated with the respective selector element. For instance, a selector element may be presented to invoke an input UI (e.g. within a threshold distance or even in some embodiments from beyond the threshold distance) based on selection of a selector element on an input device (e.g. stylus pen) such as selection of the selector 218 described above. As another example, a selector element may be presented to invoke an input UI (e.g. within a threshold distance or even in some embodiments from beyond the threshold distance) based on movement of an input device (e.g. stylus pen) as detected at the input device (e.g. using an accelerometer) which may be communicated to the device which is to present the input UI responsive to a communication from the input device that motion has been detected.

As but one more example, a selector element may be presented to invoke an input UI (e.g. within a threshold distance or even in some embodiments from beyond the threshold distance) based on pressure being applied at and/or to an input device (e.g. a pinch gesture to a stylus pen) as detected at the input device (e.g. using a pressure sensor) as e.g. meeting a pressure threshold for invoking an input UI, which may thus be communicated to the device which is to present the input UI responsive to a communication from the input device that the pressure threshold has been met. Furthermore, note that in some embodiments, the user may establish such a pressure threshold at the input device when the input device is e.g. in a pressure threshold configuration mode by applying an amount of pressure to the input device which the user desires to be the pressure threshold.

Without reference to any particular figure, it is to be understood that when it is indicated herein that an input device is within a threshold distance and/or proximity to another device, it is to be understood that being within the threshold distance may mean being at the threshold distance as well as within it.

Furthermore, it is to be understood that in at least some of the embodiments discussed herein, a body part of user rather than an input device may be detected in accordance with present principles (e.g. and thus cause an input UI to be presented). Further still, detecting the proximity and/or approach of a pen, user, etc. may be done using electromagnetic resonance (EMR) digitizers (e.g. Wacom). Still other methods of detecting pen and/or user proximity to the display may be used, such as e.g. dead-reckoning using motion sensors in the pen and calibrating (e.g. relatively) regularly when the pen or user last touches the writing surface for such purposes. What's more, an ultrasonic pen may be used in accordance with present principles to provide three dimensional location information (e.g. relative to the device) to thus provide yet another way of detecting pen proximity to a writing surface.

Even further, it is to be understood that other communication methods (e.g., Bluetooth, near field communication (NFC), Wi-Fi (e.g. Wi-Fi direct), etc.) may be used in accordance with present principles to e.g. wake, unlock, and/or change a currently presented application to an input application by sensing when a user has touched and/or picked up a stylus pen. Such input may be provided e.g. by using a touch sensor on the pen's barrel, and/or based on pen motion detection Still without reference to any particular figure, it is to be understood that the principles set forth herein provide for varying ways to invoke an input UI e.g. based on a particular application and/or UI being presented. E.g., there may be instances where changing back and forth between an input UI and another UI (e.g. based on an input device coming within a threshold distance) may not be desirable, such as e.g. when pointing using a stylus at the display of a device when giving a presentation rather than intending to provide input.

Furthermore, different applications and/or UIs (e.g. other than input applications and/or input UIs) may be associated with different input ills and/or input applications. Thus, an input UI and/or application, and/or the device itself storing the input UI or application, may be configured to e.g. present a note taking UI for a note taking application when a hover is detected above an Internet browser UI, while a (different) to-do list input UI for a to-do list input application may be presented when a hover is detected above a PowerPoint UI. What's more, some applications and/or UIs (e.g. other than input applications and/or input UIs) such as a video presentation UI may be configured to not be removed at all (so that an input UI may be presented) even if a hover within a threshold distance is detected.

Still further, in some embodiments different modes of the same UI may in one instance cause an input UI to be presented responsive to detection of a hover whereas in another instance does not cause an input UI to be presented responsive to a hover. E.g., during a full-screen mode of a video presentation, the device may be configured to not present an input UI despite detecting a hover within a threshold distance, while not in full screen mode an input UI may be presented.

Still further, it is to be understood that in some embodiments changing to an input UI responsive to a hover may be done e.g. only when a switch or button on e.g. a stylus has been actuated to an "on" position for presenting one or more input UIs in accordance with present principles, when a tab button on a Windows-enabled computer has been selected, and/or when a dedicated (e.g. input) application launch button or selector has been selected.

Also, it is to be understood that in some embodiments present principles may be undertaken even when e.g. a device (and even more specifically, the device's display) which is to present an input UI is in a locked configuration and/or mode (e.g. and/or presenting a lock screen). In such an instance, e.g. the device and/or screen may be unlocked responsive to receipt of a communication from an input device that the input device has detected movement of the input device.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or a signal per se.

While the particular PRESENTING USER INTERFACE ON A FIRST DEVICE BASED ON DETECTION OF A SECOND DEVICE WITHIN A PROXIMITY TO THE FIRST DEVICE is herein shown and described in detail, it is to be understood that the subject matter which is encompassed by the present application is limited only by the claims.

What is claimed is:
1. A first device, comprising:
a touch-enabled display;
at least one processor;
storage accessible to the at least one processor and bearing instructions executable by the at least one processor to:
determine that an input device is within a first proximity to a first location of the touch- enabled display;
in response to the determination that the input device is within the first proximity to the first location, initiate a first application for providing input to the first device at least in part based on manipulation of the input device and present on the touch-enabled display a first user interface (UI) of the first application for providing input to the first device at least in part based on manipulation of the input device;
determine that the input device is within a second proximity to a second location of the touch-enabled display, the second location being different from the first location; and
in response to the determination that the input device is within the second proximity to the second location, initiate a second application for providing input to the first device at least in part based on manipulation of the input device and present on the touch-enabled display a second UI of the second application for providing input to the first device at least in part based on manipulation of the input device, the second UI being different from the first UI;

wherein first location and the second location are established by different areas of the touch- enabled display, the different areas being established by a user; and wherein the different areas are established by a user using respective drag and drop actions.

2. The first device of claim 1, comprising the input device, and wherein the first UI is for providing input to the first device at least in part based on detection of the input device against the touch-enabled display.

3. A method, comprising:

determining that an input device is within a first proximity to a first location of a touch-enabled display;

in response to determining that the input device is within the first proximity to the first location, initiating a first application for providing input to a first device at least in part based on manipulation of the input device and presenting on the touch-enabled display a first user interface (UI) of the first application for providing input to the first device at least in part based on manipulation of the input device;

determining that the input device is within a second proximity to a second location of the touch-enabled display, the second location being different from the first location; and in response to determining that the input device is within the second proximity to the second location, initiating a second application for providing input to the first device at least in part based on manipulation of the input device and presenting on the touch-enabled display a second UI of the second application for providing input to the first device at least in part based on manipulation of the input device, the second UI being different from the first UI wherein the first application and the second application are different applications;

wherein the method further comprises:

determining that video presentation in full-screen mode is occurring at the first device while the input device comes within the first proximity and/or second proximity; and responsive to the determining that video presentation in full-screen mode is occurring at the first device while the input device comes within the first proximity and/or second proximity, declining to present the first UI and/or the second UI.

4. A computer readable storage medium (CRSM) that is not a transitory signal, the computer readable storage medium comprising instructions executable by at least one processor of a first device to:

present a first user interface (UI) on a touch-enabled display for configuring one or more settings of the first device, the first UI comprising a first setting that is selectable by a user to establish a threshold distance above the touch-enabled display within which one or more other UIs are presented responsive to detection of an input device within the threshold distance above the touch-enabled display;

determine that the input device is within the threshold distance to a first predefined location of the touch-enabled display;

in response to the determination that the input device is within the threshold distance to the first predefined location, present on the touch-enabled display a second UI at which input using the input device is receivable, the second UI being different from the first UI and the second UI not being presented prior to the determination;

determine that the input device is within the threshold distance to a second predefined location of the touch-enabled display, the second predefined location being different from the first predefined location; and in response to the determination that the input device is within the threshold distance, initiate a second application for providing input to the first device at least in part based on manipulation of the input device and present on the touch-enabled display a third UI of the second application at which input using the input device is receivable, the third UI being different from the first and second UIs.

5. The CRSM of claim 4, wherein the first UI comprises a selector element that is selectable to enable the first device to present the second UI responsive to receipt of future inputs from the input device that are generated based on selection of a button on the input device.

6. The first device of claim 1, wherein the first application and the second application are different applications.

7. The first device of claim 1, wherein the first application is different from a third application that is used to present a third UI on the touch-enabled display, the third UI being different from the first UI and the second UI, the third UI being presented prior to presentation of the first UI and at least a portion of the third UI also being presented concurrently with presentation of the first UI responsive to the determination that the input device is within the first proximity to the first location.

8. The first device of claim 7, wherein the third UI is initially presented prior to the first application being initiated in response to the determination that the input device is within the first proximity to the first location.

9. The first device of claim 1, wherein the instructions are executable to:

present a third UI on the touch-enabled display for configuring one or more settings of the first device, the third UI comprising a first setting that is selectable by a user to establish a threshold distance above the touch-enabled display, the threshold distance establishing the first and second proximities.

10. The first device of claim 1, wherein the instructions are executable to:

present a third UI on the touch-enabled display, the third UI comprising a listing of one or more other applications that are selectable from the third UI and that are different from the first and second applications, each other application being selectable from the third UI to set the first device to present the first and second UIs responsive to hovers of the input device over a fourth UI associated with the respective other application selected from the third UI.

11. The method of claim 3, wherein first location and the second location are established by a user via respective drag and drop actions.

12. The method of claim 3, comprising:

presenting a third UI on the touch-enabled display for configuring one or more settings of the first device, the third UI comprising a first setting that is selectable by a user to establish a threshold distance above the touch-enabled display, the threshold distance establishing the first and second proximities.

13. The method of claim 3, comprising:

presenting a third UI on the touch-enabled display, the third UI comprising a listing of one or more other applications that are selectable from the third UI and that are different from the first and second applications, each other application being selectable from the third UI to set the first device to present the first and second UIs responsive to hovers of the input device over a fourth UI associated with the respective other application selected from the third UI.

14. The CRSM of claim 4, wherein first predefined location is established by a user via one or more drag and drop actions.

15. The CRSM of claim 4, wherein the instructions are executable to:
present a fourth UI on the touch-enabled display, the fourth UI comprising a listing of one or more applications that are selectable from the fourth UI, each application being selectable from the fourth UI to set the first device to present the second UI responsive to hovers of the input device within the threshold distance of a respective UI associated with the respective application selected from the fourth UI.

16. The CRSM of claim 15, wherein the first UI is different from the fourth UI.

17. The CRSM of claim 4, wherein the first UI comprises a second setting that is selectable by a user to establish a threshold time that the input device is to hover within the threshold distance for the first device to present the second UI in response.

18. The CRSM of claim 4, wherein the instructions are executable to:
present a lock screen on the touch-enabled display, the lock screen corresponding to the first device being in a locked configuration;
receive a communication from the input device that the input device has detected movement of the input device; and
responsive to receipt of the communication, unlock the device from the locked configuration.

* * * * *